United States Patent
Biran et al.

(10) Patent No.: US 11,080,064 B2
(45) Date of Patent: *Aug. 3, 2021

(54) INSTRUCTIONS CONTROLLING ACCESS TO SHARED REGISTERS OF A MULTI-THREADED PROCESSOR

(71) Applicant: INTERNATIONAL BUSINESS MACHINES CORPORATION, Armonk, NY (US)

(72) Inventors: Giora Biran, Haifa (IL); Fadi Y. Busaba, Poughkeepsie, NY (US); Ophir Erez, Haifa (IL); Mark S. Farrell, Pleasant Valley, NY (US); Lisa C. Heller, Rhinebeck, NY (US); Christian Jacobi, Poughkeepsie, NY (US); Alexander Mesh, Haifa (IL); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 448 days.

This patent is subject to a terminal disclaimer.

(21) Appl. No.: 14/525,850

(22) Filed: Oct. 28, 2014

(65) Prior Publication Data

US 2016/0117169 A1 Apr. 28, 2016

(51) Int. Cl.
  *G06F 9/38* (2018.01)
  *G06F 9/30* (2018.01)
(52) U.S. Cl.
  CPC .......... *G06F 9/3824* (2013.01); *G06F 9/3004* (2013.01); *G06F 9/3009* (2013.01);
  (Continued)

(58) Field of Classification Search
  CPC ... G06F 9/30087; G06F 9/3851; G06F 9/3824
  See application file for complete search history.

(56) References Cited

U.S. PATENT DOCUMENTS 5,341,482 A 8/1994 Cutler et al.
6,128,710 A * 10/2000 Greenspan .............. G06F 9/526
                                                    711/150
(Continued)

FOREIGN PATENT DOCUMENTS

JP 2004326749 11/2004
JP 2011170619 9/2011

OTHER PUBLICATIONS

X86 Instruction Set Reference, Jul. 27, 2014, 2 pages, [retrieved from the internet on Jan. 17, 2017], retrived from URL <x86.renejeschke.de/html/file_module_x86_id_41.html>.*

(Continued)

*Primary Examiner* — Jyoti Mehta
(74) *Attorney, Agent, or Firm* — Heslin Rothenberg Farley & Mesiti P.C.; Steven Chiu, Esq.

(57) ABSTRACT

Atomic instructions, including a Compare And Swap Register, a Load and AND Register, and a Load and OR Register instruction, use registers instead of storage to communicate and share information in a multi-threaded processor. The registers are accessible to multiple threads of the multi-threaded processor, and the instructions operate on these shared registers. Access to the shared registers is controlled by the instructions via interlocking.

8 Claims, 13 Drawing Sheets

(52) U.S. Cl.
CPC ........ *G06F 9/3012* (2013.01); *G06F 9/30021* (2013.01); *G06F 9/30029* (2013.01); *G06F 9/30087* (2013.01); *G06F 9/3851* (2013.01); G06F 2209/521 (2013.01)

(56) References Cited

U.S. PATENT DOCUMENTS

| | | | |
|---|---|---|---|
| 7,664,936 | B2 | 2/2010 | Jensen et al. |
| 7,958,339 | B2 | 6/2011 | Akizuki et al. |
| 8,078,843 | B2 | 12/2011 | Alexander et al. |
| 8,219,994 | B2 * | 7/2012 | Topaloglu ............. G06F 9/5094 718/102 |
| 8,407,453 | B2 | 3/2013 | Alexander et al. |
| 8,560,814 | B2 | 10/2013 | Golla et al. |
| 8,612,978 | B2 | 12/2013 | Damron |
| 8,615,644 | B2 | 12/2013 | Bruce et al. |
| 8,695,002 | B2 | 4/2014 | Sydow et al. |
| 2005/0044319 | A1 | 2/2005 | Olukotun |
| 2005/0149936 | A1 | 7/2005 | Pilkington |
| 2006/0004988 | A1 | 1/2006 | Jordan |
| 2006/0288173 | A1 | 12/2006 | Shen |
| 2007/0124568 | A1 | 5/2007 | Kra |
| 2007/0288728 | A1 | 12/2007 | Tene et al. |
| 2008/0034190 | A1 | 2/2008 | Rodgers et al. |
| 2008/0244539 | A1 | 10/2008 | Rajamani et al. |
| 2009/0013329 | A1 | 1/2009 | May et al. |
| 2010/0023731 | A1 | 1/2010 | Ito |
| 2011/0119660 | A1 | 5/2011 | Tanaka |
| 2011/0208949 | A1 | 8/2011 | Bruce et al. |
| 2011/0276787 | A1 | 11/2011 | Koga et al. |
| 2012/0036338 | A1 | 2/2012 | Alexander et al. |
| 2012/0124338 | A1 * | 5/2012 | Webber ................. G06F 9/3851 712/213 |
| 2012/0185678 | A1 | 7/2012 | Bruce et al. |
| 2013/0074094 | A1 | 3/2013 | Lewis et al. |
| 2013/0080738 | A1 | 3/2013 | Plondke et al. |
| 2013/0139168 | A1 | 5/2013 | Arndt et al. |
| 2013/0219399 | A1 | 8/2013 | Wang et al. |
| 2013/0246761 | A1 | 9/2013 | Derby et al. |
| 2013/0263145 | A1 | 10/2013 | Gschwind et al. |
| 2013/0332711 | A1 | 12/2013 | Leidel et al. |
| 2014/0007111 | A1 | 1/2014 | Targowski |
| 2014/0089591 | A1 | 3/2014 | Moir et al. |
| 2014/0109881 | A1 | 4/2014 | Gschwind et al. |
| 2014/0137130 | A1 | 5/2014 | Jacob et al. |
| 2014/0189260 | A1 | 7/2014 | Wang et al. |
| 2014/0201452 | A1 * | 7/2014 | Meredith ............. G06F 12/128 711/130 |
| 2015/0205590 | A1 | 7/2015 | Sabne et al. |
| 2016/0048416 | A1 | 2/2016 | Nakashima |
| 2016/0092280 | A1 | 3/2016 | Ai et al. |

OTHER PUBLICATIONS

How Computers Work: The CPU and memory, Sep. 14, 2006, 7 pages, [retrieved from the internet on Jan. 17, 2017], retrieved from URL <homepage.cs.uri.edu/book/cpu_memory/cpu_memory.htm>.*
Cay Horstmann, Big Java Late Objects, Feb. 2012, John Wiley and Sons, 12 pages.*
International Search Report and Written Opinion for PCT/EP2015/074332 dated Dec. 9, 2015, pp. 1-10.
International Search Report and Written Opinion for PCT/EP2015/074335 dated Feb. 2, 2015, pp. 1-13.
Tullsen, D.M. et al., "Supporting Fine-Grained Synchronization on a Simultaneous Multithreading Processor," Fifth International Symposium on High-Performance Computer Architecture, Jan. 1999, pp. 54-58.
IBM, "z/Architecture—Principles of Operation," IBM Publication No. SA22-7832-04, Sep. 2005, pp. 3-31-3-52 and 4-22-4-35.
Office Action for U.S. Appl. No. 14/525,800 dated Jan. 22, 2016, pp. 1-21.
Office Action for U.S. Appl. No. 14/846,900 dated Jan. 22, 2016, pp. 1-13.
Alexander et al., "Controlling Execution of Threads in a Multi-threaded Processor," U.S. Appl. No. 14/525,800, filed Oct. 28, 2014, pp. 1-55.
Alexander et al., "Controlling Execution of Threads in a Multi-threaded Processor," U.S. Appl. No. 14/846,900, filed Sep. 7, 2015, pp. 1-51.
Biran et al., "Instructions Controlling Access to Shared Registers of a Multi-Threaded Processor," U.S. Appl. No. 14/847,157, filed Sep. 8, 2015, pp. 1-50.
List of IBM Patents or Patent Applications Treated as Related dated Mar. 18, 2016, pp. 1-2.
Watson et al., "Hardware Threading Techniques for Multi-Threaded MPSoCs", 2014 ACM, MES'14, Jun. 2014, pp. 1-4; <http://dl.acm.org/citation.cfm?id=1854326&CFID=848381830&CFTOKEN=31099602>.
Akkary et al., "Synchronization-Free Multithreading Architecture and Application Programming Interface", 2014 IEEE, Apr. 2014, pp. 472-478; <http://ieeexplore.ieee.org/stamp/stamp.jsp?arnumber=6820580>.
Bob Rogers, "Understanding Simultaneous Multithreading on z Systems", NewEra Software, Sep. 2015, pp. 1-23: <http://www.newera.com/INFO/SMT_z_09_2015.pdf>.
Notice of Allowance, U.S. Appl. No. 14/525,800, dated Oct. 11, 2016, 43 pages.
Notice of Allowance, U.S. Appl. No. 14/846,900, dated Oct. 13, 2016, 43 pages.
Anonymously; "Meta-Core Processors"; An IP.com Prior Art Database Technical Disclosure; http://ip.com/IPCOM/000199834D; Sep. 17, 2010, pp. 1-6.
Anonymously; "Trace-Core Processors"; An IP.com Prior Art Database Technical Disclosure; http://ip.com/IPCOM/000199882D; Sep. 20, 2010, pp. 1-16.
"Z/Architecture—Principles of Operation," Publication No. SA22-7832-09, 10th Edition, Sep. 2012, 1562 pages.
Jesshope, Chris; "Implementing an Efficient Vector Instruction Set in a Chip Multi-Processor Using Micro-Threaded Pipelines", IEEE Proceedings 6th Australasian on Computing Systems Architecture Conference (ACSAC 2001), Jan. 29, 2001, pp. 80-88.
ip.com et al.; "Method and Mechanism to Promote Fairness in a Resource Partitioned Multi-Threaded Core", IPCOM000211743D, Oct. 14, 2011, pp. 1-3.
Lian et al.; "Thread Priority Sensitive Simultaneous Multi-Threading Fair Scheduling Strategy", Computational Intelligence and Software Engineering (CiSE 2009) International Conference On, Dec. 11-13, 2009, pp. 1-4.
Tullsen et al., "Supporting Fine-Grained Synchronization on a Simultaneous Multithreading Processor", Research Gate, Dec. 1998, https://www.researchgate.net/publication/2762400, 21 pages.
EP Exam Report and Office Action, EP Application No. 15797164.1, dated Mar. 17, 2021, received Mar. 23, 2021, 3 pages.
Tullsen et al., "Supporting Fine-Grained Synchronization on a Simultaneous Multithreading Processor", High-Performance Computer Architecture, 1999. Proceedings. Fifth Inter National Symposium on Orlando, FL, USA, Jan. 9-13, 1999, Los Calamitos, CA, US, IEEE Comput. Soc, US, Jan. 9, 1999, XP010321127, ISBN: 978-0/7695-0004-1, 5 pages.
"z/Architecture—Principles of Operation, Publication No. SA22-7832-04", Sep. 1, 2005, Fifth Edition, XP002482598, 38 pages.

* cited by examiner

INSTRUCTIONS CONTROLLING ACCESS TO SHARED REGISTERS OF A MULTI-THREADED PROCESSOR

BACKGROUND

One or more aspects relate, in general, to multi-threaded processors, and in particular, to facilitating control in such processors.

A processor may include multiple hardware threads that have instructions executing simultaneously. Such a processor is said to implement simultaneous multi-threading (SMT), which is a technique used to improve overall efficiency of a processor by permitting multiple independent threads of execution to better utilize resources provided by modern processor architectures.

When two or more threads share a common multi-threaded processor, they often need to communicate and share information. Typically, this is accomplished by using instructions that communicate through storage. However, these instructions may be slow and involve store-hit-load or load-hit-store conflicts, and/or communication via the storage may be undesirable or impossible.

SUMMARY

Shortcomings of the prior art are overcome and advantages are provided through the provision of a computer system for facilitating control in a multi-threaded processor. The computer system includes, for instance, a memory; and a processor in communications with the memory, wherein the computer system is configured to perform a method. The method includes, for instance, obtaining, by the processor, an instruction to be executed to perform an operation, the processor being a multi-threaded processor and the instruction being initiated by a thread of the multi-threaded processor; initiating execution, by the multi-threaded processor, of the instruction to perform the operation, the operation comprising multiple sub-operations to be performed atomically; determining whether the instruction is to continue to execute, the determining using interlocking to determine whether the instruction has atomic access to one or more registers shared by the thread and one or more other threads of the multi-threaded processor, wherein the interlocking is to control inter-thread operations; and continuing execution of the instruction based on the interlocking indicating the instruction is to execute, the continuing execution comprising performing the operation including using at least one shared register of the one or more registers shared by the thread and the one or more other threads of the multi-threaded processor to perform the operation.

Methods and computer program products relating to one or more embodiments are also described and claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In accordance with one or more aspects, a capability is provided for controlling execution of threads (e.g., hardware threads) in a core (e.g., a physical hardware processor; also referred to herein as a processor or processor core) operating within a computing environment. The core supports, for instance, multi-threading, such as simultaneous multi-threading (SMT), which means there can be effectively multiple logical central processing units (CPUs) operating simultaneously on the same physical processor hardware. Each of these logical CPUs is considered a thread.

In such a multi-threading environment, it may be desirous for one thread to stop other threads on the processor core from executing. This may be in response to running a critical sequence or other sequence that needs the processor core resources or is manipulating processor core resources in a way that other threads would interfere with its execution. In one example, as part of the capability, it may be desirable to wait until some condition has been satisfied for all the threads on the processor core. For example, assume software or firmware running on a particular hardware thread wants to perform a system action that first requires no stores are in progress from the entire processor core, that is, no stores are in progress on all the threads on the processor core. To determine if the other threads are stopped, an instruction, referred to herein as a Drain instruction, is provided, in accordance with one aspect, that monitors the status of the threads on the processor core.

Further, in accordance with one or more aspects, in controlling execution of the threads, various atomic instructions may be used. These instructions operate on registers accessible to and shared by the threads of the SMT processor, rather than storage or memory. (Memory and storage are used interchangeably herein, unless otherwise noted implicitly or explicitly.) This allows multiple threads to communicate and share information using the shared registers, rather than storage. These instructions, referred to herein as Compare And Swap R-Unit Register or Compare and Swap Register instruction, Load and OR R-Unit Register or Load and OR Register instruction, and Load and AND R-Unit Register or Load and AND Register instruction, control access to the shared registers using interlocking, as described herein.

Figure 1:
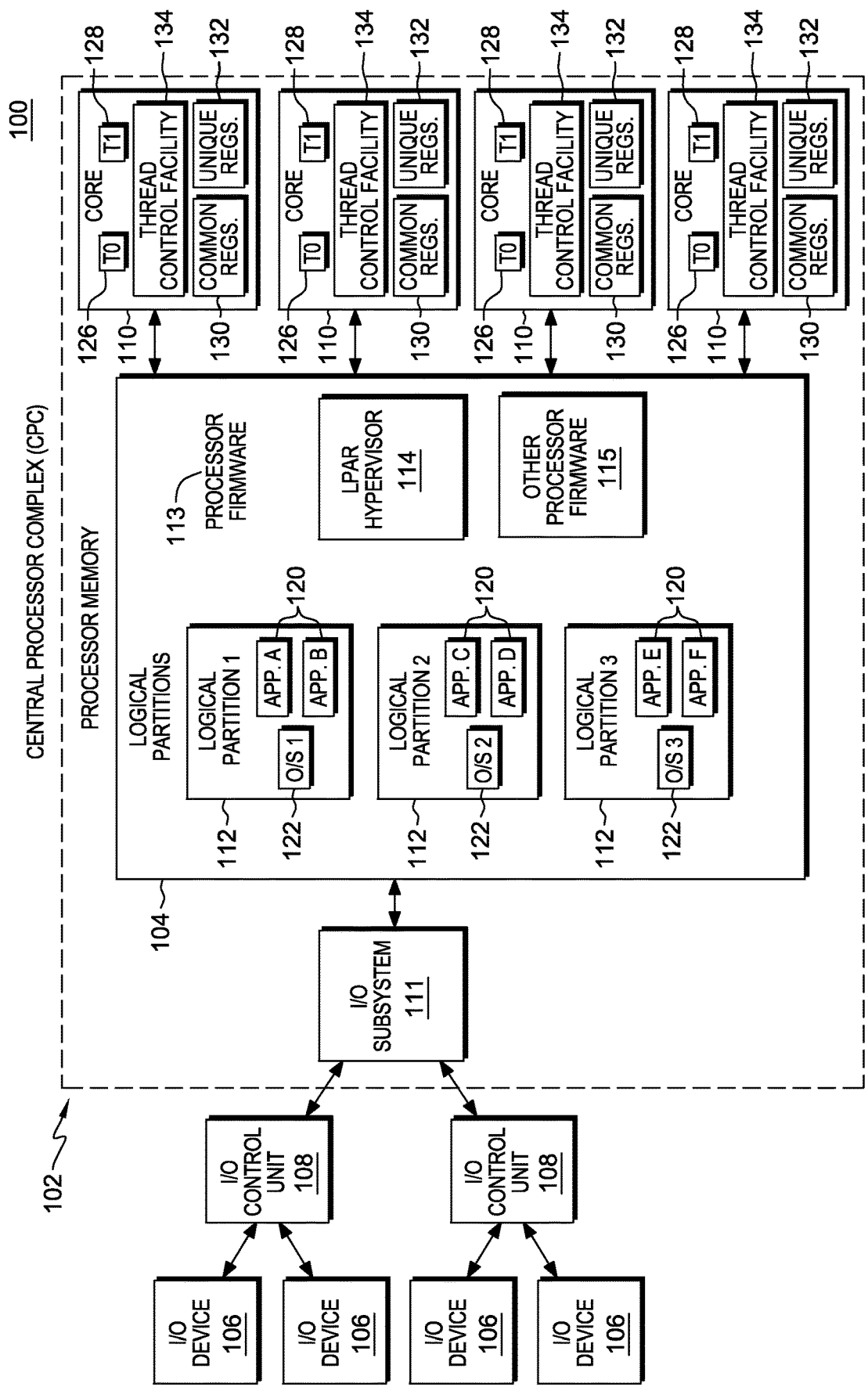
FIG. 1 depicts one example of a computing environment to incorporate and use one or more aspects of controlling execution of threads.

One example of a computing environment to incorporate and use one or more aspects of controlling execution of threads is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-09, $10^{th}$ Edition, September 2012, which is hereby incorporated by reference herein in its entirety.

Z/ARCHITECTURE, IBM, and Z/VM, Z/OS, POWER, and POWERPC (referenced herein) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more processor cores 110, and an input/output subsystem 111, each of which is described below.

Processor memory 104 includes, for example, one or more partitions 112 (e.g., logical partitions), and processor firmware 113, which includes, e.g., a logical partition hypervisor 114 and other processor firmware 115. One example of logical partition hypervisor 114 is the Processor Resource/System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y.

Logical partitions 112 are managed by logical partition hypervisor 114, which is implemented by firmware running on cores 110. As used herein, firmware includes, e.g., the microcode and/or millicode of the processor core. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Processor cores 110 are physical processor resources allocated to the logical partitions. In particular, each logical partition 112 has one or more logical processors, each of which represents all or a share of a core 110 allocated to the partition. The logical processors of a particular partition 112 may be either dedicated to the partition, so that the underlying core resource 110 is reserved for that partition; or shared with another partition, so that the underlying core resource is potentially available to another partition.

In one example, at least one of the cores is a multi-threading processor, such as a simultaneous multi-threading processor, that includes multiple threads (i.e., multiple logical CPUs operating simultaneously). In one example, the core includes two threads, but in other embodiments, there may be more than two threads. Two threads, referred to herein as T0 (126) and T1 (128), are only one example.

In support of simultaneous multi-threading, the processor core hardware contains the full architected state (e.g., z/Architecture and micro-architected state) for each thread. Thus, processor-wide registers 130, which are common to all threads (referred to herein as common registers), as well as thread-specific registers 132, which are unique to a thread (referred to herein as unique registers) are provided. Use of these registers is described further below.

To control execution of the multiple threads, core 110 includes hardware and/or logic to provide such control as described herein. This hardware and/or logic is referred to herein as a thread control facility 134 for convenience.

Input/output subsystem 111 directs the flow of information between input/output devices 106 and main storage 104. It is coupled to the central processing complex, in that it can be a part of the central processing complex or separate therefrom. The I/O subsystem relieves the processor cores of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 2:
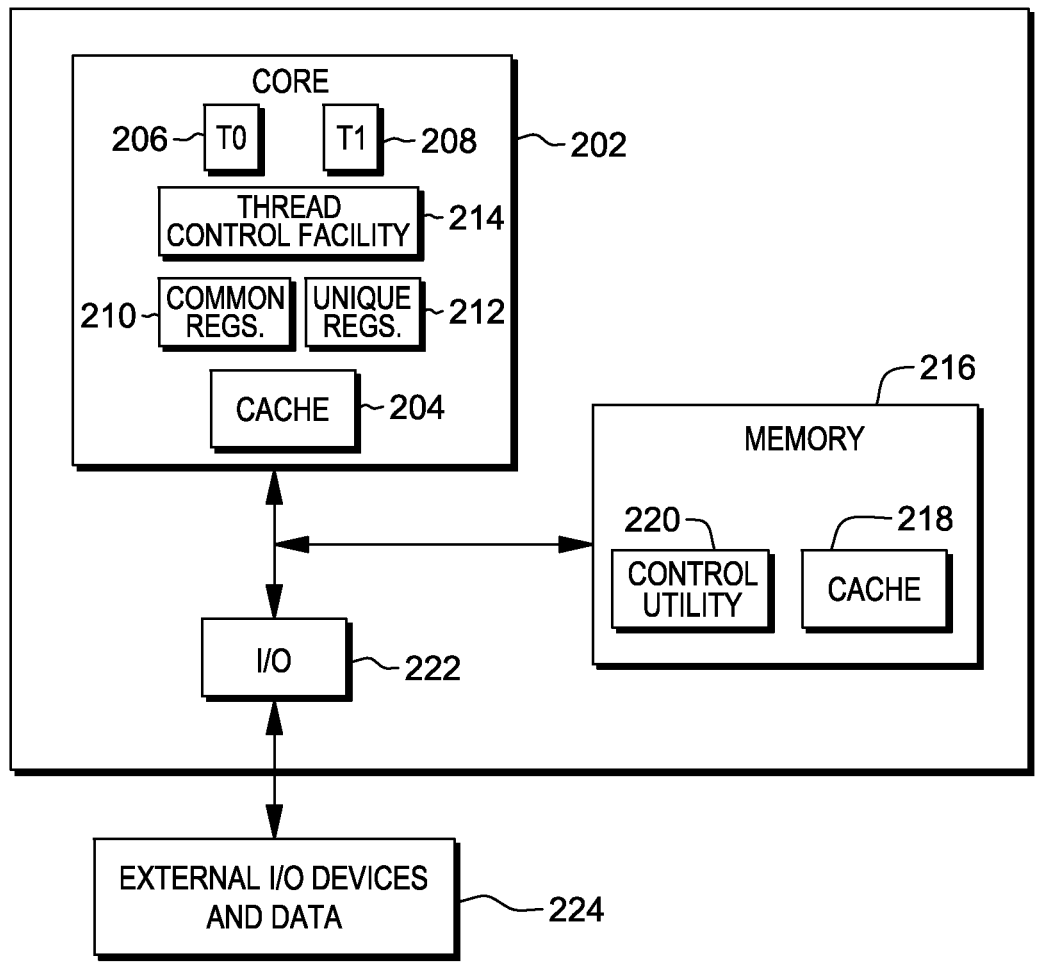
FIG. 2 depicts another example of a computing environment to incorporate and use one or more aspects of controlling execution of threads.

Another example of a computing environment to incorporate and use one or more aspects of controlling execution of threads is described with reference to FIG. 2. In this example, a computing environment 200 includes a non-partitioned environment implemented based on the z/Architecture (or another architecture in another embodiment). It includes a core 202 that includes, for instance, one or more caches 204; at least two threads, T0 (206), T1 (208); a common set of registers 210 for the threads; and a unique set of registers 212 for each thread, as well as a thread control facility 214.

Core 202 is communicatively coupled to a memory 216 having one or more caches 218 and at least one control utility 220, such as an operating system; and to an input/output (I/O) subsystem 222. I/O subsystem 222 is communicatively coupled to external I/O devices 224 that may include, for example, data input devices, sensors and/or output devices, such as displays.

Figure 3A:
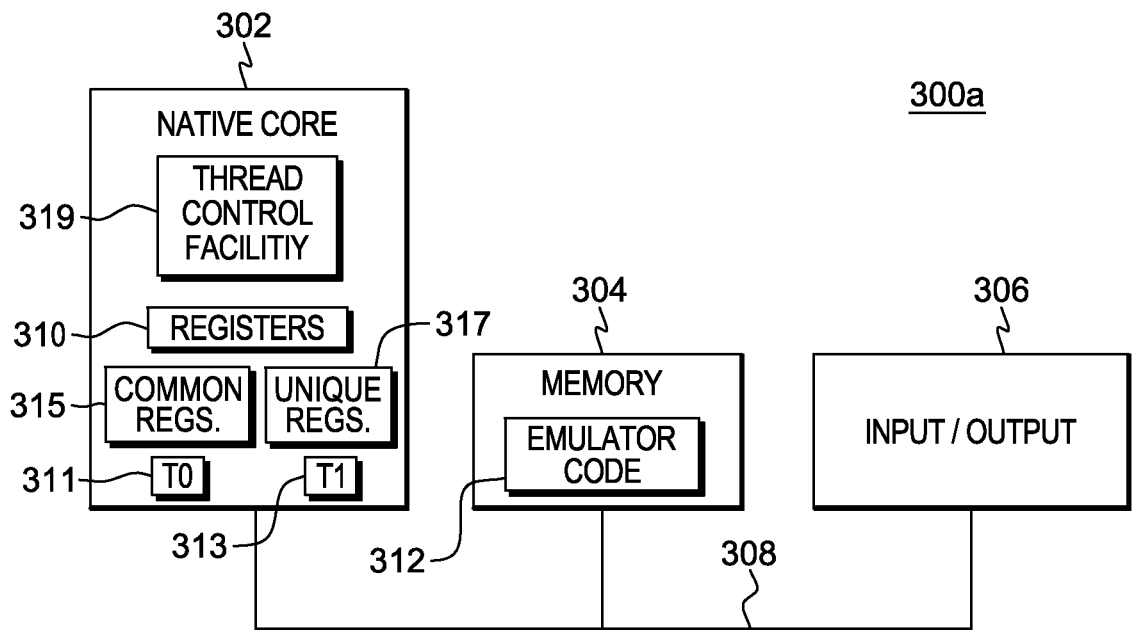
FIG. 3A depicts yet another example of a computing environment to incorporate and use one or more aspects of controlling execution of threads.

Another embodiment of a computing environment to incorporate and use one or more aspects of controlling execution of threads is described with reference to FIG. 3A. In this example, a computing environment 300a includes, for instance, a native core 302, a memory 304, and one or more input/output devices and/or interfaces 306 coupled to one another via, for example, one or more buses 308 and/or other connections. As examples, computing environment 300a may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native core 302 includes one or more native registers 310, such as one or more general purpose registers and/or one or more special purpose registers used during processing within the environment that include information that represents the state of the environment at any particular point in time. Further, native core may include, for instance, at least two threads, T0 (311), T1 (313); a set of common registers 315 for the threads; a set of thread-specific registers 317 for each thread; and a thread control facility 319.

Moreover, native core 302 executes instructions and code that are stored in memory 304. In one particular example, the processor core executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture.

Figure 3B:
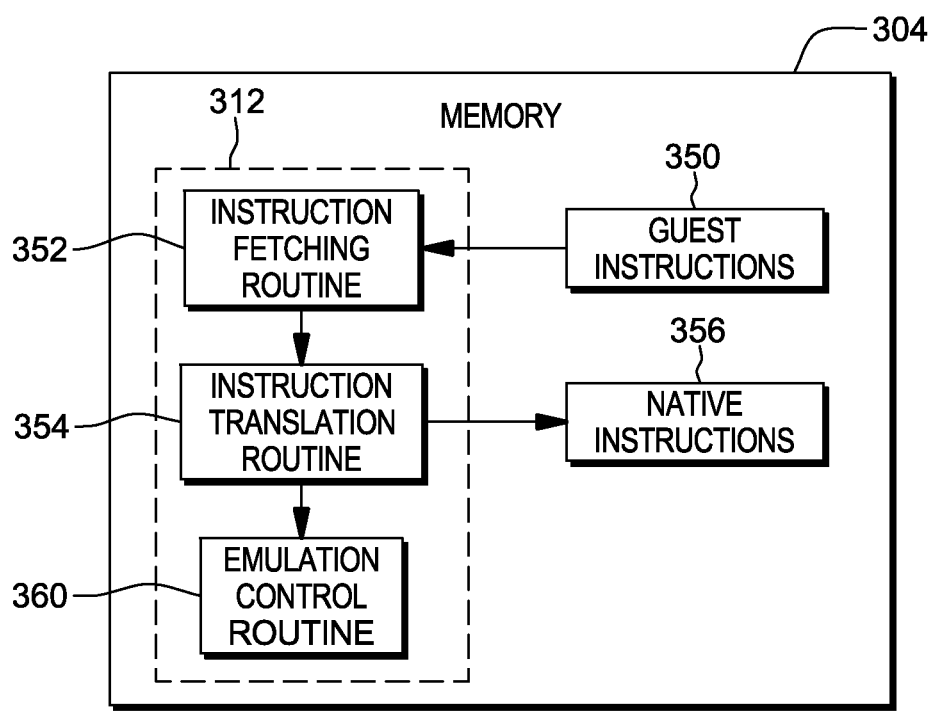
FIG. 3B depicts further details of a memory of the computing environment of FIG. 3A.
Figure 3C:
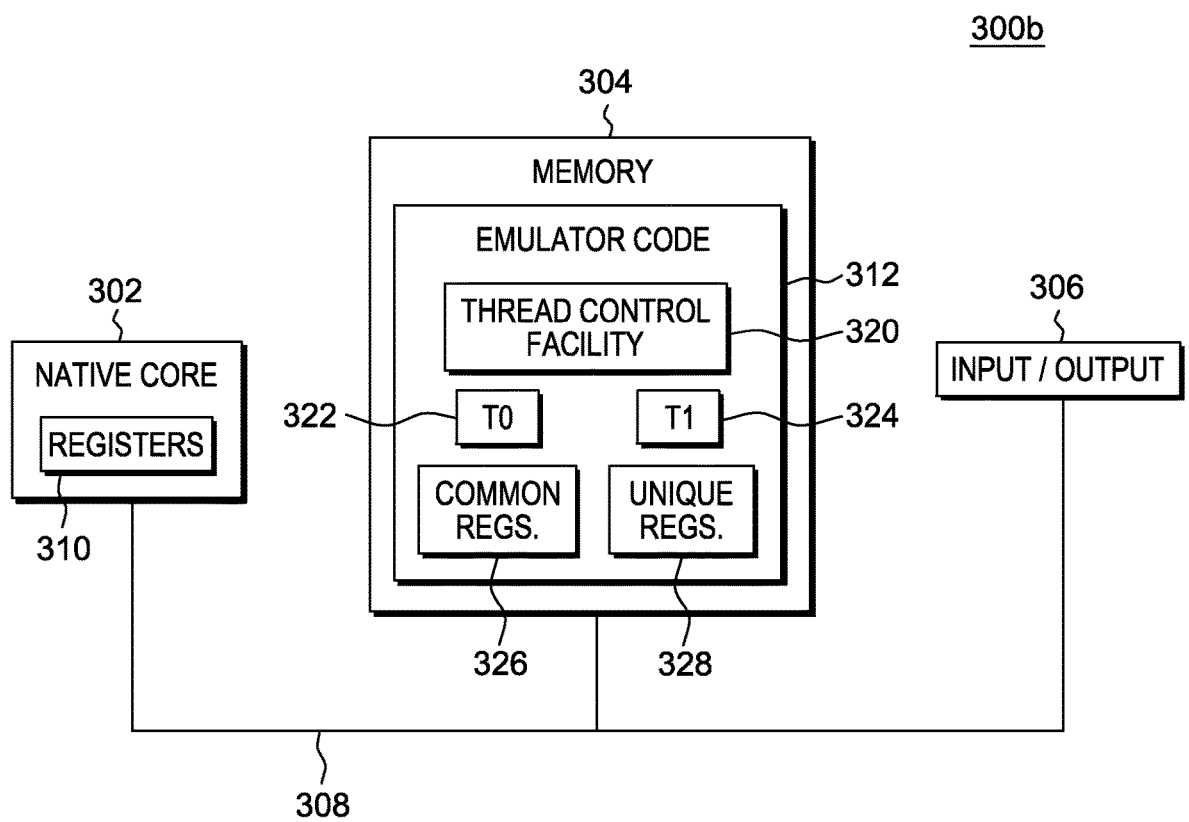
FIG. 3C depicts a further example of a computing environment to incorporate and use one or more aspects of controlling execution of threads.

In a further embodiment, as shown in FIG. 3C, core 302 is a single-threaded core, but a multi-threaded core is being emulated and included within emulator code 312. For instance, emulator code 312 includes an emulated thread control facility 320; emulated threads 322, 324; emulated common registers 326 and emulated unique registers 328, each of which is based on an architecture different from the architecture of native core 302, such as the z/Architecture.

Further details relating to emulator code 312 are described with reference to FIG. 3B. Guest instructions 350 stored in memory 304 comprise software instructions (e.g., correlating to machine instructions) that were developed to be executed in an architecture other than that of native core 302. For example, guest instructions 350 may have been designed to execute on a z/Architecture core 202, but instead, are being emulated on native core 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native core 302 to execute a routine of native instructions that emulate one or more previously obtained guest instructions and, at the conclusion of such execution, return control to the instruction fetch routine to emulate the obtaining of the next guest instruction or a group of guest instructions. The guest instructions may be instructions of the thread control facility described herein. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native core 302. In other examples, one or more of the routines or operations are implemented in firmware, hardware, software or some combination thereof. The registers of the emulated processor may be emulated using registers 310 of the native core or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Figure 4A:
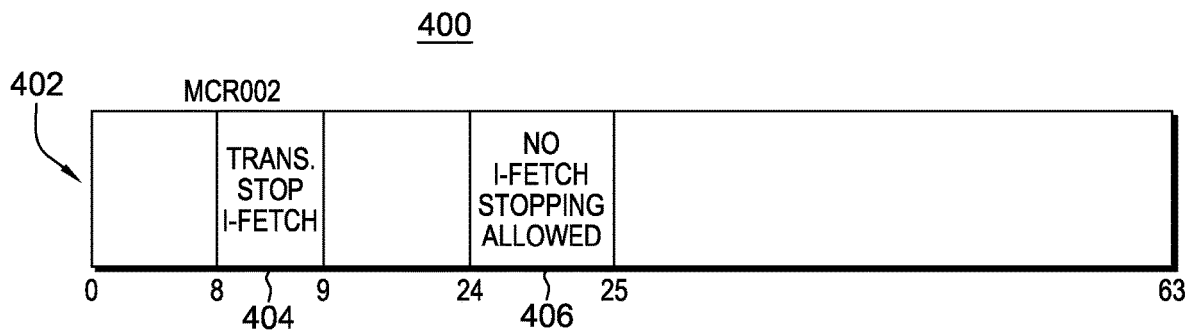
FIG. 4A depicts one example of a control register used in accordance with one aspect of controlling execution of threads.

As indicated above, associated with each thread is a plurality of registers. One shared register common to the threads is a control register, such as a millicode control register (MCR), MCR002, an example of which is depicted in FIG. 4A. MCR002 (400) includes various controls for SMT that determines how the threads behave. In one embodiment, MCR002 (400) includes a plurality of fields 402, and those fields used in accordance with one or more aspects include, for instance:
 (a) A transient stop I-fetch field 404: The two bits of this field correspond one-to-one with threads 0 and 1 (if there were more than two threads, then there may be more than two bits). When a bit is '1'b, this becomes an effective transient master override to block I-fetching regardless of the state of other control bits; and
 (b) A No I-fetch stopping allowed field 406: The two bits of this field correspond one-to-one with threads 0 and 1 (if there were more than two threads, then there may be more than two bits). When a bit is '1'b, it indicates this thread is entering a section of code (e.g., critical section) in which the other thread is not allowed to turn on the stop I-fetch bit for this thread.

Figure 4B:
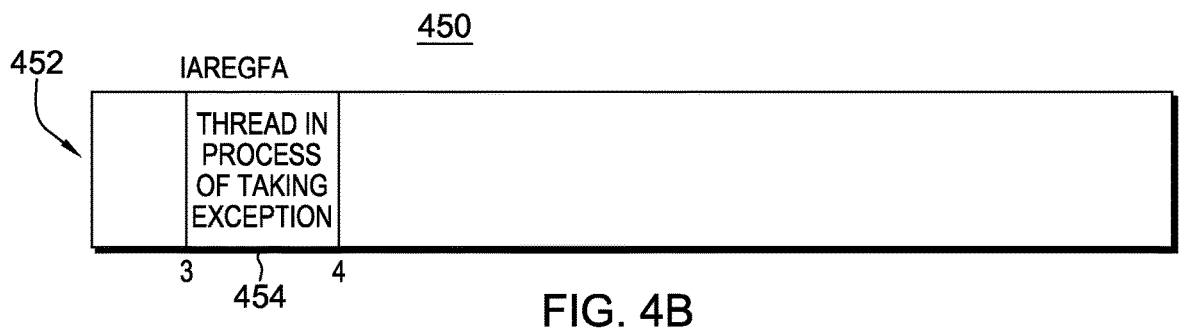
FIG. 4B depicts one example of an instruction address register used in accordance with one aspect of controlling execution of threads.

Another register used is an instruction address register, which is unique for each thread. This register, referred to as IAREGFA, includes information about a program interruption detected by hardware. An example of IAREGFA is depicted in FIG. 4B. As shown, IAREGFA 450 includes a plurality of fields 452. One field used in accordance with one or more aspects is field 454 that indicates the thread is in process of taking an exception.

Each of the above registers may include additional, less and/or different fields. Further, there may be other registers that are used. The registers and fields described herein are examples of registers and/or fields that may be used. Further, MCR and IAREGFA are just examples of names of the registers. Many other variations are possible.

Figure 5:
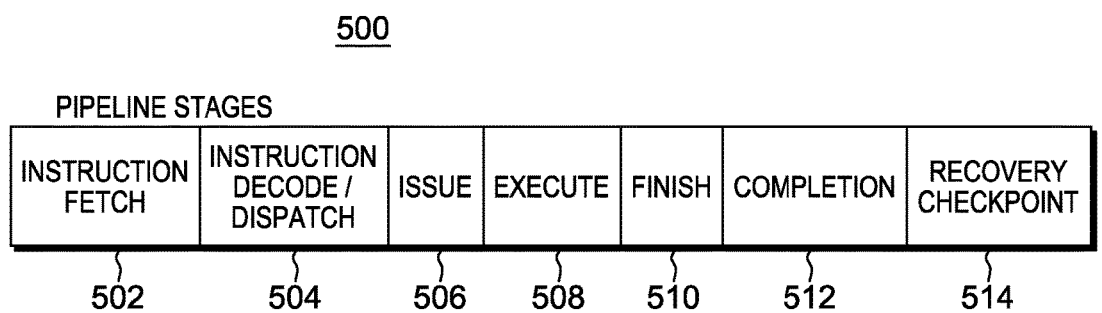
FIG. 5 depicts one example of stages of a pipeline.

To increase instruction throughput, each thread uses an instruction pipeline for processing allowing multiple operations to be performed at the same time. An instruction pipeline includes a plurality of stages, and one example of such a pipeline is described with reference to FIG. 5. Referring to FIG. 5, a pipeline 500 which supports out-of-order processing, includes, for instance, an instruction fetch stage 502 in which instructions are fetched from memory; an instruction decode/dispatch stage 504 which forms dispatch/completion groups and puts instructions into the issue queue; an issue stage 506 in which the instructions are issued (out-of-order); an execute stage 508 in which the instructions are executed (out-of-order); a finish stage 510 in which instructions are finished (out-of-order); a completion stage 512 which refers to an architectural checkpoint; and a recovery checkpoint stage 514. Other pipelines may include additional, less and/or different stages. The stages described herein are only examples.

In one example, up to three instructions (in particular, micro-operations) can be placed into a group. However, certain instructions, such as branch instructions, end a group even if it is not full. A full group of instructions is steered to the same issue queue, and then, the next group goes into another issue queue.

In accordance with an aspect of the present invention, a capability is provided for one thread running in a core to stop one or more other threads executing within the core in order to perform one or more operations. In the examples described herein, the core is an SMT-2 design indicating that there are two threads. However, in other embodiments, there may be more than two threads.

One embodiment of the logic used to control execution of one or more threads is described with reference to FIG. 6. In this example, Thread 0 (T0) executing on a core is attempting to stop Thread 1 (T1) executing on the core, and therefore, the description refers to T0 and T1; however, in other embodiments, T1 may be attempting to stop T0; and/or there may be more than one thread executing on the core being stopped. For instance, T0 may be stopping T1, T2, T3, etc. Further, in the examples described herein, the logic is performed by firmware of the core; however, in one or more other embodiments, it may be performed by general purpose software. Many other variations are possible.

As described with reference to FIG. 6, in one embodiment, one thread stops execution of another thread, and the stopping uses one or more controls (e.g., indicators, bits, etc.) in one or more registers (e.g., hardware registers) shared by the threads.

Figure 6:
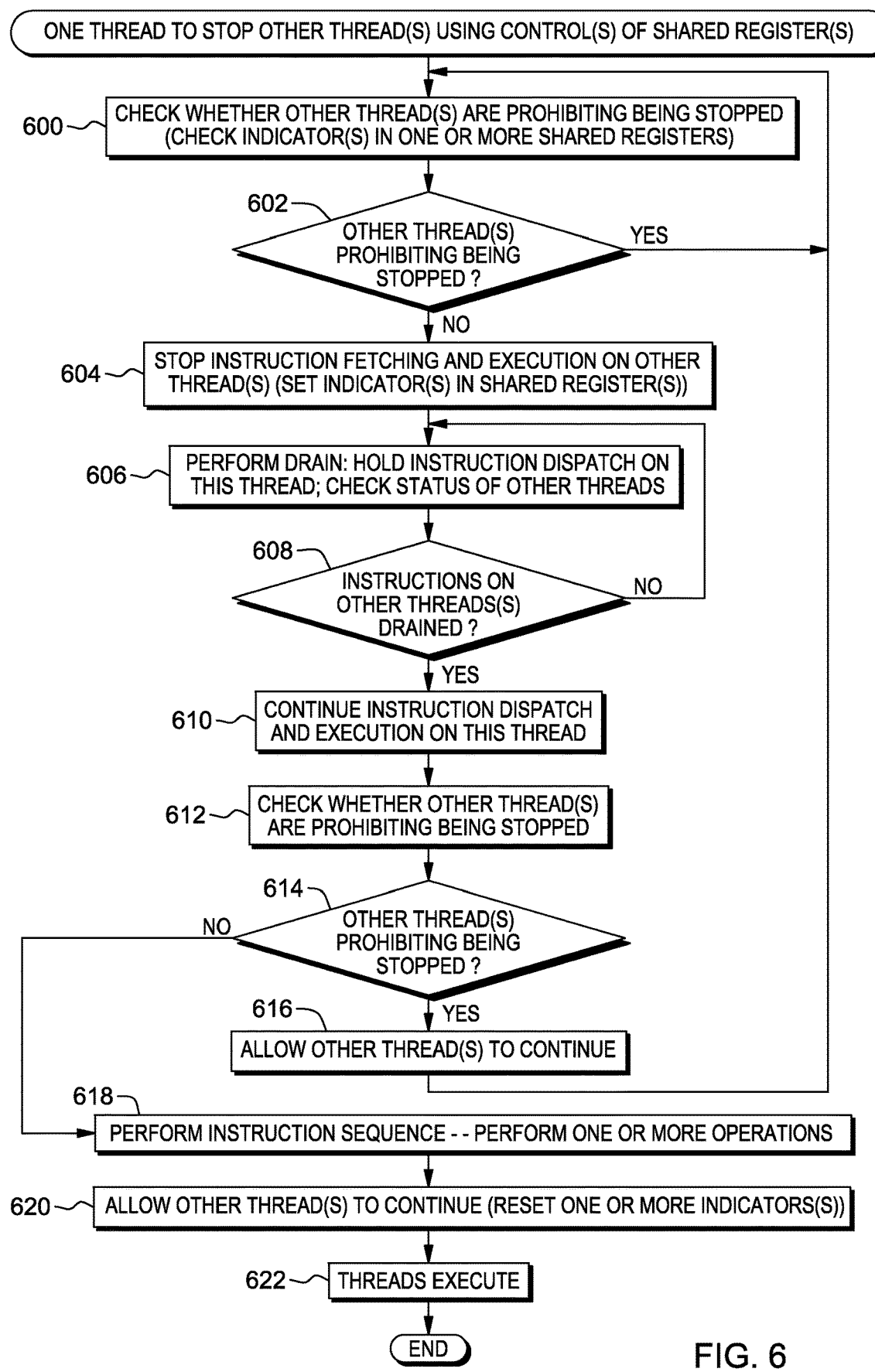
FIG. 6 depicts one example of logic to control execution of threads in a multi-threaded processor.

Referring to FIG. 6, in one embodiment, Thread 0 checks whether T1 (or in other embodiments, one or more threads of the core) is prohibiting being stopped, STEP 600. In one example, this is determined by checking a selected bit (e.g., bit 25) of MCR002, as well as a selected bit (e.g., bit 4) of IAREGFA. This is accomplished, in one example, by T0 testing a branchpoint, referred to a STPIFALW. STPIFALW tests the selected bits of MCR002 and IAREGFA. For instance, if MCR0002.25 (i.e., bit 25 of MCR002) is set to zero and IAREGIFA.4 (i.e., bit 4 of IAREGIFA) is set to zero, then the stopping of I-fetching of T1 is allowed.

If STPIFALW indicates that T1 is prohibiting being stopped, INQUIRY 602, then processing continues to STEP 600. However, if T1 is not prohibiting being stopped, as indicated by STPIFALW, and in particular MCR002.25=0 and IAREGFA.4=0, then processing continues by T0 stopping instruction fetching and execution on T1, STEP 604. In one example, this includes T0 setting the transient stop I-fetch bit for T1 (e.g., MCR002.9), which stops instruction fetching and execution on T1. This bit is set using, for instance, a Compare and Swap R-Unit Register (CSGRU) instruction or a Load and OR R-Unit register instruction, each of which is described below.

Thereafter, T0 performs a drain operation for all the threads (DRAIN ALLTIDS), STEP 606, which holds instruction dispatch for T0 until all instructions on T1 are drained or flushed from the pipeline, and queries T1 for status. In one example, a Drain instruction is used to perform the drain operation, an example of which is described below.

While the pipeline is being drained of the instructions on the other threads, INQUIRY 608, processing continues with STEP 606. However, responsive to the instructions on T1 being drained, T0 continues instruction dispatch and execution for T0, STEP 610.

Thereafter, T0 checks again whether T1 (and other threads, if any) is prohibiting being stopped, to ensure T1 did not change its status after being tested but before being stopped, STEP 612. This check is performed, as described above, using STPIFALW. If T1 is now prohibiting being stopped, INQUIRY 614, then T0 allows T1 to continue to execute by turning off bit 9 of MCR002 (i.e., set it to zero), STEP 616. Processing proceeds to STEP 600.

Otherwise, if T1 is not prohibiting being stopped, INQUIRY 614, then T0 performs the instruction sequence (e.g., one or more operations) that caused the stopping of T1, STEP 618. After that instruction sequence is complete, T1 is allowed to continue, STEP 620. Thus, T0 resets bit 9 in MCR002 by using, for instance, a Load and AND R-Unit (LNRU) instruction or CSGRU, as described below. Thereafter, both threads execute normally, STEP 622.

As described above, a number of instructions are used to control execution of one or more threads of a multi-threading processor. Each of these instructions is described below.

Figure 7A:
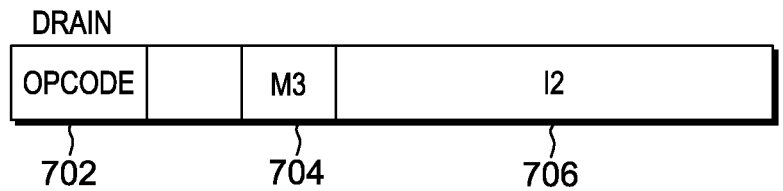
FIG. 7A depicts one example of a format of a Drain instruction.
Figure 7B:
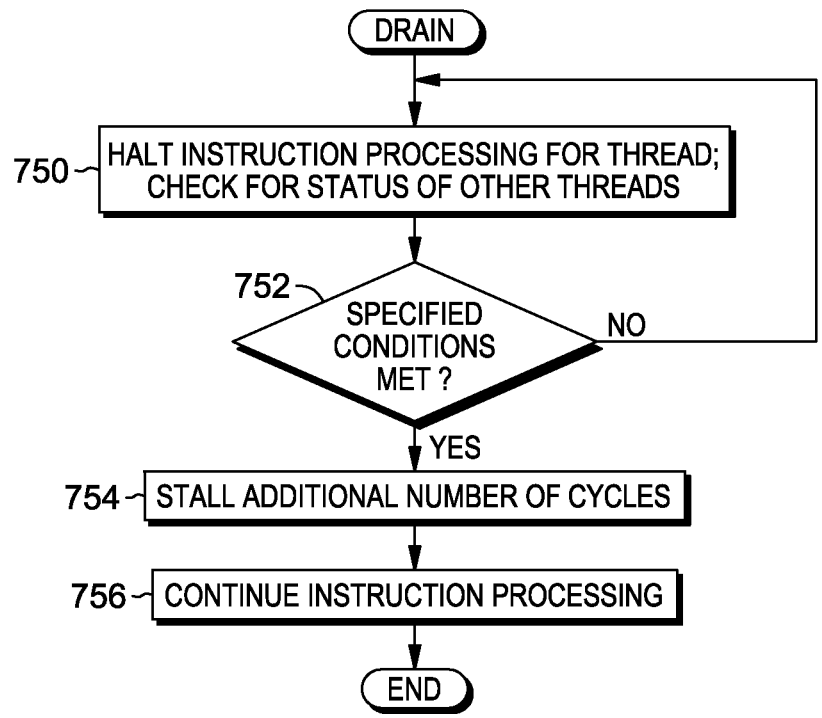
FIG. 7B depicts one embodiment of logic associated with the Drain instruction of FIG. 7A.

Referring to FIGS. 7A-7B, one embodiment of a Drain instruction is described. In particular, FIG. 7A depicts one embodiment of a format of the Drain instruction, and FIG. 7B depicts one embodiment of the logic associated with the Drain instruction.

With reference to FIG. 7A, a Drain instruction 700 includes an opcode field 702 that includes an operation code identifying a drain operation; a mask (M3) field 704 that includes a value indicating a stall count, which specifies how many cycles processing is stalled; and an instruction field 706 (I2) that indicates the type of drain, which, in this example, is a drain all TIDS (Thread IDs) specifying that all threads are to be drained.

In operation and with reference to FIG. 7B, thread T0 halts instruction processing for T0, at the instruction decode or dispatch stage of the pipeline until specified conditions are met, STEP 750. Specified bits of the I2 field of the instruction (e.g., bits 0:31 of I2, which are, e.g., bits 16:47 of the I-text field, which includes all of the fields of the instruction) specify which one or more hardware conditions are to be met prior to continuing instruction processing. In one embodiment, the specified conditions include a cross-thread control (e.g., bit 0 of the I2 field; bit 16 of the I-text field), which checks the status of T1 (or other threads) to determine whether processing has been halted on T1. When bit 0 of the I2 field is '1'b, it specifies that all the other drain conditions are to be met on both threads in order to continue processing on this thread (the other thread(s) are not blocked by a DRAIN on this thread). When using this function, care is to be taken to avoid hangs.

In one or more embodiments, other conditions may be specified in the I2 field. A one in a given bit position indicates that condition is to be met prior to resuming instruction processing; if more than one bit is on, all selected conditions are to be met. In implementation, in one embodiment, when I-text bit 16 (i.e., bit 0 of the I2 field) is 1, the logical OR of both (or all) hardware threads' status functions are performed, on a bit-by-bit basis, before ORing together all functions that are selected to determine the final value of whether the DRAIN conditions are satisfied.

A determination is made as to whether the specified conditions have been met, INQUIRY 752. If not, then the halting continues, STEP 750. Otherwise, if the conditions have been met, processing is stalled an additional number of cycles, STEP 754. This additional number may be zero or more, and is specified in the M3 field of the Drain instruction. For instance, the M3 field specifies an additional number of cycles between 0 and 15, as examples, to stall after the conditions specified in the I2 field are satisfied. Subsequent to stalling the additional number of cycles, instruction processing resumes, STEP 756.

In one embodiment, if a prior instruction and the drain are being dispatched simultaneously, the prior instruction is allowed to complete dispatch and continue through the pipeline normally, but the Drain instruction and all subsequent instructions will be blocked at dispatch until the conditions are satisfied. Note that the Drain instruction only operates on this thread in delaying processing. To stop another thread, the technique described herein is used. However, a specified bit (e.g., bit 0 of I2), when 1, indicates that all specified conditions on all threads are to be met in order to continue processing after the drain instruction on this thread.

As indicated, the M3 field of the instruction specifies the number of additional cycles to stall at the pipeline. This may be used in conjunction with any of the allowed conditions in the I2 field. It may also be specified with the I2 field all zeros which gives an immediate cycle count delay at dispatch. There is a stall of one cycle in dispatching of the Drain instruction even when the M3 field is zero. Therefore, this count specifies the number of cycles to delay plus one cycle. The hardware can issue the Drain along with other instructions and it can issue out-of-order since it only affects the front-end stages of the pipeline.

This instruction is intended for use where the necessary interlocks to guarantee correct operation are not built into the hardware. In most cases, the hardware automatically covers windows from prior instructions in the pipeline.

The condition code is not changed by this instruction.

Figure 8A:
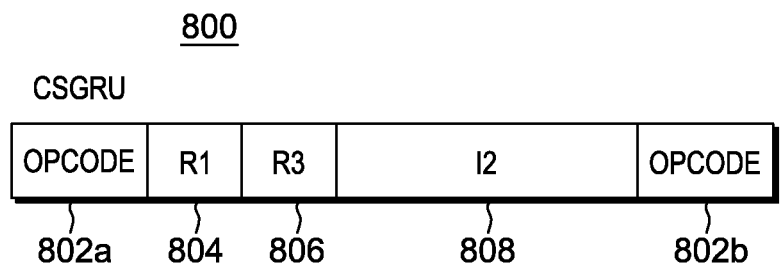
FIG. 8A depicts one example of a format of a Compare And Swap R-Unit Register instruction.
Figure 8B:
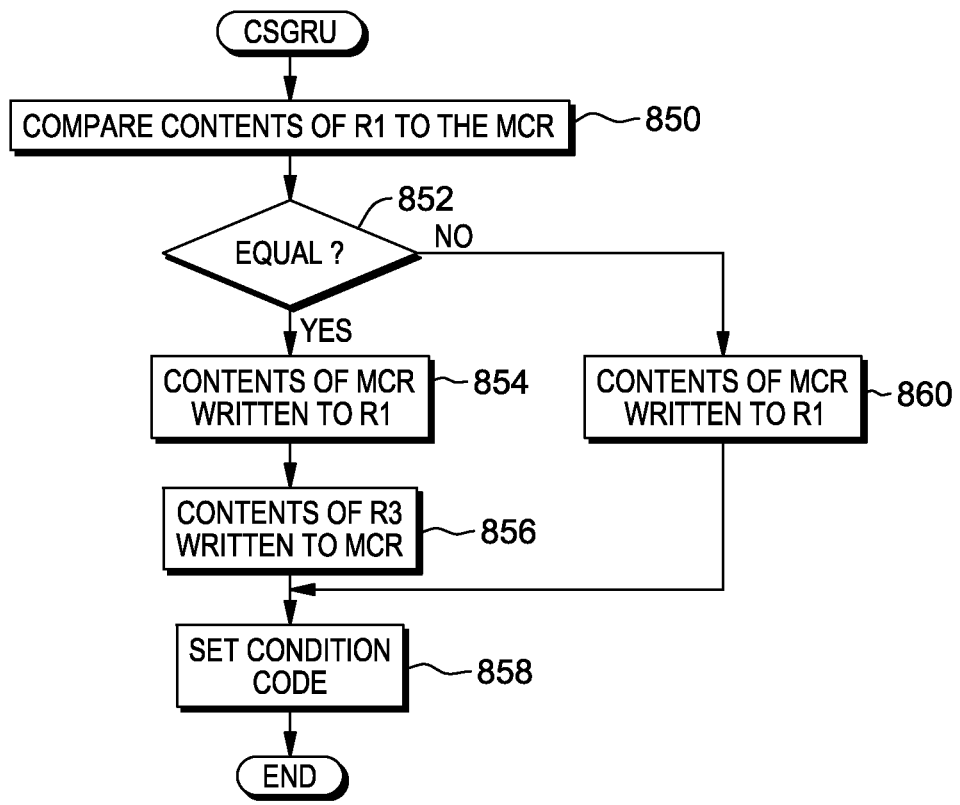
FIG. 8B depicts one embodiment of logic associated with the Compare And Swap R-Unit Register instruction of FIG. 8A.

Another instruction used is the Compare and Swap R-Unit Register instruction, which is described with reference to FIGS. 8A-8B. In particular, FIG. 8A depicts one embodiment of a format of the Compare and Swap R-Unit Register instruction, and FIG. 8B depicts one embodiment of the logic associated with the Compare and Swap R-Unit Register instruction. It should be noted that R-Unit in the instructions discussed herein refers to a particular unit within the core that performs the instruction. However, the use of a particular unit is not necessary. It may be performed by other units or simply by the core.

With reference to FIG. 8A, a CSGRU instruction 800 includes at least one opcode field 802a, 802b including an operation code specifying a compare and swap register operation; a first register field (R1) 804; a second register field (R3) 806; and an instruction field (I2) 808, each of which is described below.

In operation and with reference to FIG. 8B, the contents of the R-Unit register (referred to herein as MCR) specified by the 10-bit absolute register number indicated in selected bits (e.g., bits 22:31 of the I-text (e.g., bits 6:15 of the I2 field (808)) are compared with the contents of a general register (GR) specified in R1, STEP 850. If they are equal, INQUIRY 852, then the contents of MCR is written to the general register specified in R1, STEP 854, and the contents of the general register specified in R3 is written to MCR, STEP 856. Additionally, the condition code is set to zero, STEP 858, and processing of CSGRU is complete.

Returning to INQUIRY 852, if the contents of MCR and the register specified in R1 are not equal, then the contents of MCR are written to the register specified in R1, STEP 860, and the condition code is set to one, STEP 858. This concludes processing of CSGRU.

The read-compare-replace function of CSGRU is an atomic operation as observed by this thread, T0, and the other threads of this processor (e.g., T1). In one embodiment, CSGRU is executed with the SLOW option on in order to avoid cross-thread hangs. The SLOW option is indicated by setting a selected bit (e.g., bit 17) of I2 (808) to one, and is used to request slow-mode, which means there is only one instruction in the entire pipeline at a time. Further, interlocking is performed with this instruction, as described below, and therefore, a selected bit (e.g., bit 16) of I2 (808), referred to herein as ILOCK, is set to one.

In one embodiment, this instruction is rejected and reissued, if another selected instruction, such as RSR (Read Special Register), WSR (Write Special Register), NSR (AND Special Register), OSR (OR Special Register), XSR (Exclusive OR Special Register), TRBIT (Test Register Bit), RASR (Read Absolute Special Register), WASR (Write Absolute Special Register), TARBIT (Test Absolute Register Bit), NASR (AND Absolute Special Register), OASR (OR Absolute Special Register), XASR (Exclusive OR Absolute Special Register), LORU (Load and OR R-Unit Register), LNRU (Load and AND R-Unit Register) or CSGRU (Compare and Swap R-Unit Register), is in the pipeline for this thread (T0) or any other thread and the ILOCK bit (e.g., I2 bit 16) is on for the other instruction. This instruction is issued, for instance, only after all prior instructions from this thread have issued and also forces all future instructions from this thread to be dependent on it.

The condition code settings include, for instance: CC0—comparison equal, R-unit register replaced by GR R1; CC1—comparison unequal, R-unit register is unchanged.

Another instruction used is the Load and OR R-Unit Register (LORU) instruction, which is described with reference to FIGS. 9A-9B. In particular, FIG. 9A depicts one embodiment of a format of the Load and OR R-Unit Register instruction, and FIG. 9B depicts one embodiment of the logic associated with the Load and OR R-Unit Register instruction.

Figure 9A:
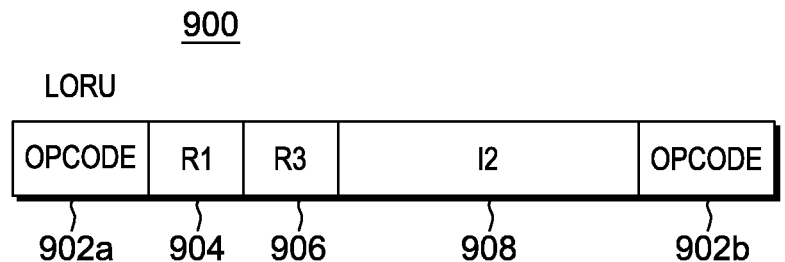
FIG. 9A depicts one example of a format of a Load and OR R-Unit Register instruction.

With reference to FIG. 9A, a LORU instruction 900 includes at least one opcode field 902a, 902b including an operation code specifying a load and OR register operation; a first register field (R1) 904; a second register field (R3) 906; and an instruction field (I2) 908, each of which is described below.

Figure 9B:
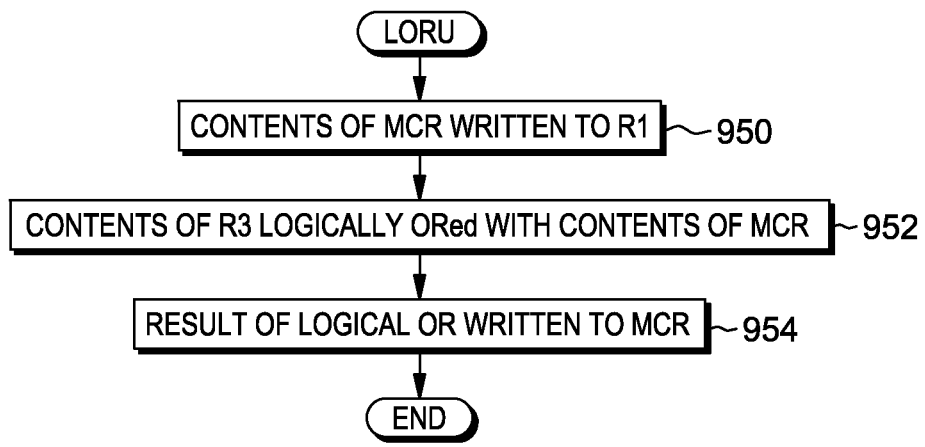
FIG. 9B depicts one embodiment of logic associated with the Load and OR R-Unit Register instruction of FIG. 9A.

In operation and with reference to FIG. 9B, the contents of the R-Unit register (referred to herein as MCR) specified by the 10-bit absolute register number indicated in selected bits (e.g., bits 22:31 of the I-text (e.g., bits 6:15) of the I2 field (908)) are loaded into the general register specified in R1, STEP 950. Further, the contents of the general register specified in R3 are logically ORed with the contents of MCR, STEP 952, and the result is written into MCR, STEP 954.

The read-OR-replace function of LORU is an atomic operation as observed by this thread, T0, and the other threads of this processor (e.g., T1). In one embodiment, LORU is executed with the SLOW option on in order to avoid cross-thread hangs. The SLOW option is indicated by setting a selected bit (e.g., bit 17) of I2 (908) to one. Further, interlocking is performed with this instruction, as described below, and therefore, a selected bit (e.g., bit 16) of I2 (908), referred to herein as ILOCK, is set to one.

In one embodiment, this instruction is rejected and reissued, if another selected instruction, such as RSR (Read Special Register), WSR (Write Special Register), NSR (AND Special Register), OSR (OR Special Register), XSR (Exclusive OR Special Register), TRBIT (Test Register Bit), RASR (Read Absolute Special Register), WASR (Write Absolute Special Register), TARBIT (Test Absolute Register Bit), NASR (AND Absolute Special Register), OASR (OR Absolute Special Register), XASR (Exclusive OR Absolute Special Register), LORU (Load and OR R-Unit Register), LNRU (Load and AND R-Unit Register) or CSGRU (Compare and Swap R-Unit Register), is in the pipeline for this thread (T0) or any other thread and the ILOCK bit (I2 bit 16) is on for the other instruction. This instruction is issued, for instance, only after all prior instructions from this thread have issued and also forces all future instructions from this thread to be dependent on it.

The condition code is unchanged.

Another instruction used is the Load and AND R-Unit Register (LNRU) instruction, which is described with reference to FIGS. 10A-10B. In particular, FIG. 10A depicts one embodiment of a format of the Load and AND R-Unit Register instruction, and FIG. 10B depicts one embodiment of the logic associated with the Load and AND R-Unit Register instruction.

Figure 10A:
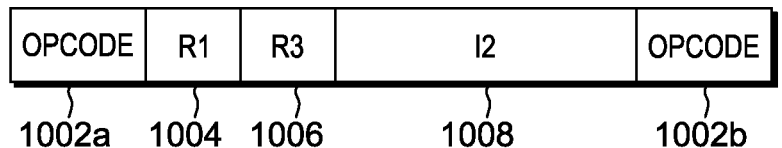
FIG. 10A depicts one example of a format of a Load and AND R-Unit Register instruction.

With reference to FIG. 10A, a LNRU instruction 1000 includes at least one opcode field 1002a, 1002b including an operation code specifying a load and AND register operation; a first register field (R1) 1004; a second register field (R3) 1006; and an instruction field (I2) 1008, each of which is described below.

Figure 10B:
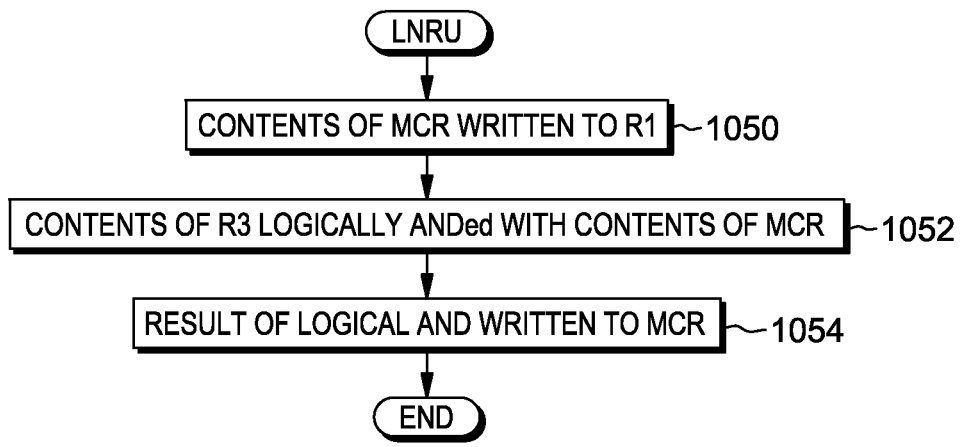
FIG. 10B depicts one embodiment of logic associated with the Load and AND R-Unit Register instruction of FIG. 10A.

In operation and with reference to FIG. 10B, the contents of the R-Unit register (referred to herein as MCR) specified by its 10-bit absolute register number indicated in selected bits (e.g., bits 22:31 of the I-text (e.g., bits 6:15 of the I2 field (1008)) are loaded into the general register specified in R1, STEP 1050. Further, the contents of the general register specified in R3 are logically ANDed with the contents of MCR, STEP 1052, and the result is written into MCR, STEP 1054.

The read-AND-replace function of LNRU is an atomic operation as observed by this thread, T0, and the other threads of this processor (e.g., T1). In one embodiment, LNRU is executed with the SLOW option on in order to avoid cross-thread hangs. The SLOW option is indicated by setting a selected bit (e.g., bit 17) of I2 (1008) to one. Further, interlocking is performed with this instruction, as described below, and therefore, a selected bit (e.g., bit 16) of I2 1008, referred to herein as ILOCK, is set to one.

In one embodiment, this instruction is rejected and reissued, if another selected instruction, such as RSR (Read Special Register), WSR (Write Special Register), NSR (AND Special Register), OSR (OR Special Register), XSR (Exclusive OR Special Register), TRBIT (Test Register Bit), RASR (Read Absolute Special Register), WASR (Write Absolute Special Register), TARBIT (Test Absolute Register Bit), NASR (AND Absolute Special Register), OASR (OR Absolute Special Register), XASR (Exclusive OR Absolute Special Register), LORU (Load and OR R-Unit Register), LNRU (Load and AND R-Unit Register) or CSGRU (Compare and Swap R-Unit Register), is in the pipeline for this thread (T0) or any other thread and the ILOCK bit (e.g., I2 bit 16) is on for the other instruction. This instruction is issued, for instance, only after all prior instructions from this thread have issued and also forces all future instructions from this thread to be dependent on it.

The condition code is unchanged.

LNRU, as well as LORU and CSGRU, use registers that are accessible to all threads in the SMT core, rather than storage as a means of shared communication. These registers are, for instance, hardware registers separate from memory or storage of the processor. For example, in one core design, there are approximately 64 registers that are shared (common) to all threads on the core; threads can freely read and write these shared registers. In some cases of control registers, if both threads would attempt to write them without special interlocks, an update by one of the threads could be lost. In other cases, only one of the threads is permitted to "own" a resource controlled by bits in the register. Therefore, these atomic instructions that operate on shared registers are used to control and order access to these shared registers.

LNRU, LORU and CSGRU each allows an atomic operation between general registers and MCR across threads by using interlocking to control inter-thread operations and execution. As indicated, each of the instructions has an ILOCK bit, and when that bit is on for an instruction executing in the pipeline, if a second instruction enters the pipeline with its ILOCK bit also set, the second instruction is rejected (and re-executed later when the first instruction completes). This guarantees atomicity with accesses to these registers between threads.

There are, for instance, two types of interlocking instructions: a single micro-operation μop instruction, such as LNRU and LORU; and a two μop instruction, such as CSGRU. With a single μop instruction, the interlock is set at the μop issue (RSR- and WSR-type instruction) and cleared at the μop completion for an RSR-type and on checkpoint for a WSR-type. In a two μop instruction, the interlock is set at the first μop (RSR-type) issue and is cleared at checkpoint of the second μop (WSR-type).

Further details regarding using interlocking and interlocking are described with reference to FIGS. 11A-11B. This logic is performed by the core, and in particular, by a pipe on which the instruction is issued.

Figure 11A:
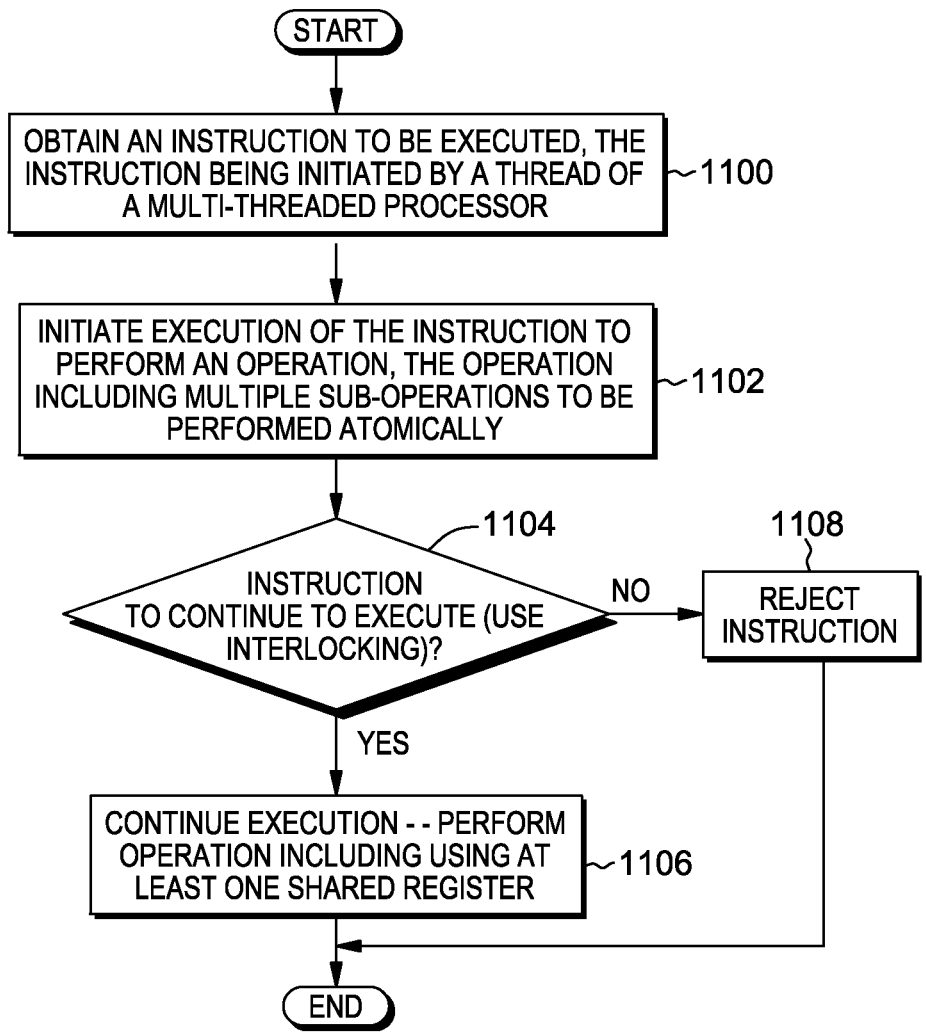
FIGS. 11A-11B depict one example of logic associated with interlocking used by one or more instructions.
Figure 11B:
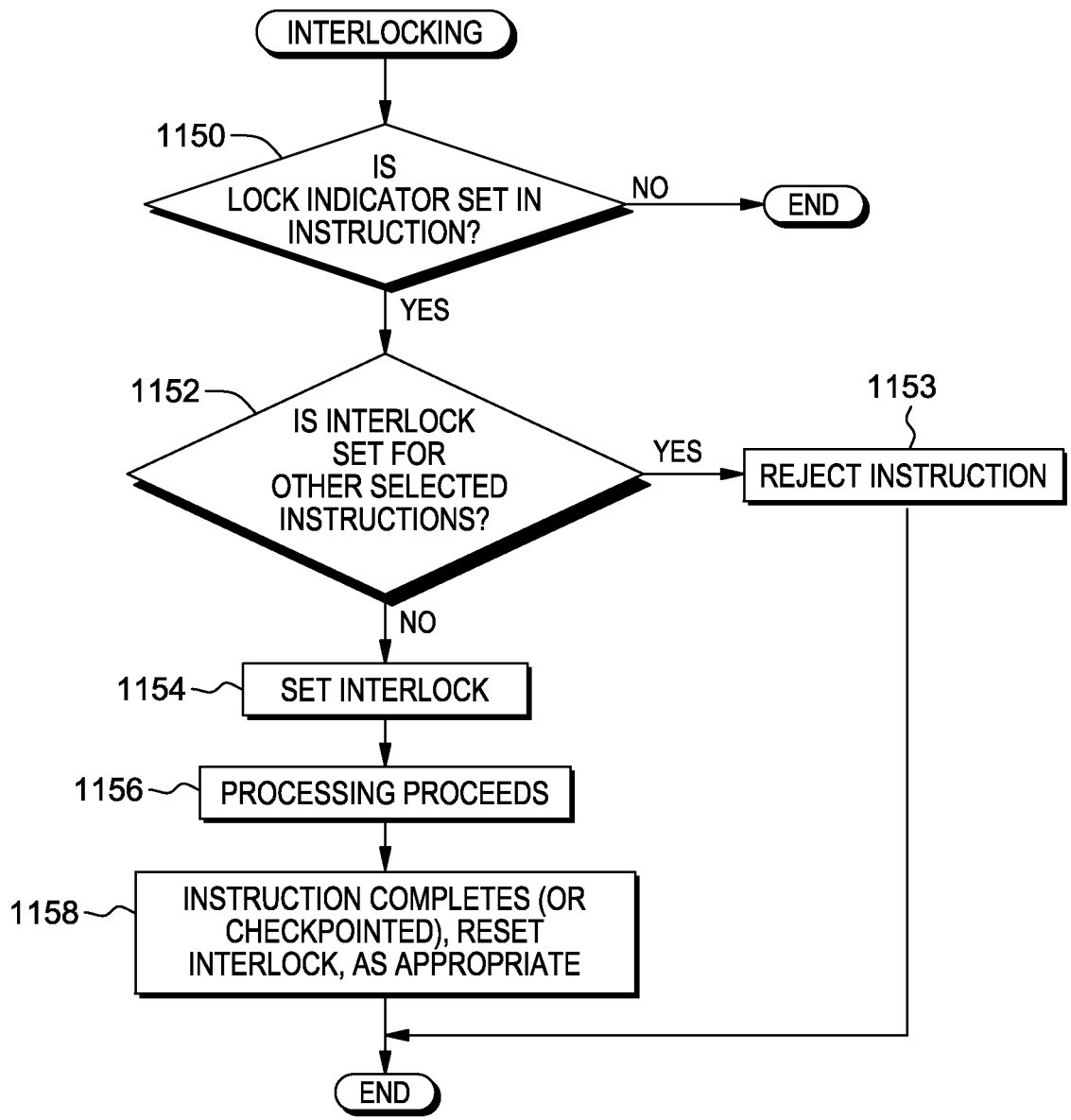

Referring initially to FIG. 11A, an instruction to be executed (e.g., LNRU, LORU, CSGRU) is obtained by a multi-threaded processor, STEP 1100. Execution of the instruction is initiated by the multi-threaded processor to perform an operation, STEP 1102. The operation includes multiple sub-operations to be performed atomically. A determination is made as to whether the instruction is to continue to execute, INQUIRY 1104. The determining uses, for instance, interlocking to determine whether the instruction has atomic access to one or more registers shared by the thread and one or more other threads.

If the instruction is to continue to execute, execution continues, which includes performing the operation using at least one shared register, STEP 1106. Otherwise, if the instruction is not to continue, it is rejected, STEP 1108.

Further details relating to the interlocking are described with reference to FIG. 11B. Initially, when an instruction enters the R-unit, in one example, a check is made as to whether a lock indicator, such as the ILOCK bit (e.g., bit 32 of I-text—a.k.a., bit 16 of I2) of the incoming instruction, is set (e.g., set to 1), INQUIRY 1150. If the ILOCK bit is not set, then interlocking processing is complete; however, if the ILOCK bit in the incoming instruction is set, then a further determination is made as to whether a lock, referred to as an interlock, is set, INQUIRY 1152. The interlock is placed in a hardware register accessible to multiple threads.

If the interlock is set (e.g., a bit is set to one) indicating that another instruction is processing that has its ILOCK bit set, then the incoming instruction is rejected, STEP 1153.

However, if the interlock is not set, then it is set, STEP 1154, and processing of the instruction proceeds (e.g., in the pipe), STEP 1156. When the instruction completes (or is checkpointed), the interlock is reset (e.g., set to zero), STEP 1158.

Further details regarding interlocking include:
(A) Interlock can be set by pipe0 when, for instance:
there is an instruction in pipe0 which needs to set the interlock and it is issued alone
there is an instruction in pipe0 which needs to set the interlock and there is another instruction in pipe1 which does not want to set the lock—both instructions from same thread.
there is an instruction in pipe0 which needs to set the interlock and there is another instruction in pipe1 which needs to set the lock but the instruction in pipe0 is older—both instructions from same thread.
there is an instruction in pipe0 which needs to set the interlock and there is another instruction in pipe1 which does not want to set the lock—both instructions from different threads.
there is an instruction in pipe0 which needs to set the interlock and there is another instruction in pipe1 which needs to set the lock—both instructions from different threads—and the LFSR (Linear Feedback Shift Register) points to pipe0. The LFSR is used to produce a pseudo-random number and by taking the most significant bit of the number, a pseudo-random selection is provided between the two pipes (i.e., randomly choose which pipe would set the interlock).

In one example, the interlock is a vector having a bit for each possible instruction in a dispatch group. For instance, in one example, there may be up to three instructions in a dispatch group, and therefore, the interlock includes three bits, one for each instruction. When a bit is set, e.g., to 1, this indicates that the instruction associated with that bit has the interlock.

The interlock can also be set by pipe1, as described above, however pipe0 is replaced with pipe1, and pipe1 with pipe0.
(B) Set of the interlock is performed when, for instance:
there is a valid instruction in the pipe AND
the ILOCK is set AND
the predec_rd (i.e., an early indication of a Read (RSR)-type instruction) OR predec_wr (i.e., early indication of a write (WSR)-type instruction) is set AND
the instruction in the pipe isn't flushed/xconded AND
the interlock can be set by that pipe (according to (A)) AND
the interlock is not yet set
(C) Interlock is updated when, for instance:
there is a valid instruction in the pipe AND
the ILOCK is set AND
the predec_rd OR predec_wr is set AND
the instruction in the pipe is not flushed/xconded AND
the interlock is already set AND
the instruction.GTAG (the identifier of a dispatch group that includes the instruction)=interlock.GTAG (i.e., is the identifier associated with the instruction=to the identifier that set the interlock) AND
the instruction.th_id (thread id)=interlock.th_id In one embodiment, reset of an interlock is performed on group completion if there is no write-type micro-operation (μop) in the group that grabbed the lock. If there is a write-type μop in the group but it did not grab the lock, then the lock is released also on that completion (did not grab the lock=ILOCK bit is 0—this is why the ILOCK bit for CSGRU is also set in the WSR part so it is not released on the completion of the RSR). If the write-type instruction also grabbed the lock, then the lock will be released only on checkpoint. In that way atomicity will be seen. An exception is for CSGRU where the WSR is in the second group—hence the RSR of the first group sets the lock and the WSR in the second group releases the lock. In that case, the first group is to come before the second group (which has a GTAG that is greater by 1 from the GTAG of the first group).

A reject of a μop in the group might not reset the lock if that μop does not hold it. The reject will release the lock only, in one example, if there are no other μops in the group which also holds the lock.

A rescind of a μop in the group might not reset the lock if that μop does not hold it. The rescind will release the lock only, in one example, if there are no other μops in the group which also holds the lock.

When xcond is coming, a check is made as to whether the interlock can be released. The problem is that the xcond should release the lock only if the instruction that grabbed it was not completed yet. If the instruction that grabbed the lock is already completed, then the xcond should have no affect on the lock (this is true for the write-type instruction which grabbed the lock since that instruction will release it on checkpoint. For a read-type instruction, the release was already done on completion). One exception is CSGRU which its read-type part can already be completed but if there would be an xcond before the write-type completes the lock is to be released (if the write type completes then xcond which will come later should have no effect on the interlock).

A reset in case the instruction which set the lock needs to be flushed: the actual reset will be done only, e.g., if the lock is not held any more by any instructions of that group. For example, if the flush hits the first μop in the group and this μop holds the lock, then the lock is free (of course, the two other μops can hold it too but they are flushed). If the flush is coming on the second μop in the group and this μop holds the lock, then the lock is free only, e.g., if the first μop does not hold it too (the third will be flushed anyway so no need to check it).

(D) Interlock is reset when, for instance:
Interlock is already set AND
No updates from (C) AND
(
The instruction which grabbed the lock is completing:
the read instruction which locked it is completing AND
this is not the first group completion of CSGRU
OR
(
The instruction which grabbed the lock is checkpointing:
the write instruction which locked it is checkpointing AND Interlock.GTAG=Instruction.GTAG
OR
  if this is the second group completion of the CSGRU,
    then wait for it to be checkpointed AND
  Interlock.GTAG+1=Instruction.GTAG)
)
OR
The μop which grabbed the lock is rejected and no other
  holders in that group
OR
The μop which grabbed the lock is rescinded and no other
  holders in that group
OR
The μop which grabbed the lock is flushed/xconded and
  no other holders in that group
OR
recovery ongoing)
)
(E) Reject when, for instance:
1) the interlock is locked AND
  the instruction.th_id!=(not equal) interlock.th_id AND
  the instruction.GTAG !=interlock.GTAG
For a CSGRU opcode, this eliminates the reject of the WSR μop when the interlock was locked by the RSR μop (they have the same GTAG and same thread ID).

It is also true for groups like (RSR, x, WSR) where the issue is in order but the RSR for some reason gets rejected and hence the WSR locks the lock. In such case if the reject will be on an individual instruction id basis, the RSR would not be able to enter since the lock is locked and the whole group would not be able to complete==> a deadlock since the WSR cannot release the lock. The solution is to use the GTAG so the RSR will be able to enter and when it completes, the WSR would be able to complete too and would release the lock.

2) same thread on both pipes AND
  the ILOCK is on in both pipes AND
  current pipe holds the younger instruction
    ==> the current younger instruction should be rejected
      (also if the interlock bit is not turned on yet by the older instruction).

In case the interlock is turned on, the older should be rejected too by the (1) condition (unless this is the WSR of the CSGRU instruction).

3) different threads on both pipes AND
  the ILOCK is on in both pipes AND
  current pipe number does not equal the LFSR's value
    (which is 0 for pipe0 and 1 for pipe1)==> the current pipe_x instruction should be rejected (also if the interlock bit is not turned on yet by the older instruction).

In case the interlock is turned on, both should be rejected by the (1) condition (unless one of them is the WSR of the CSGRU instruction).

Described herein is one embodiment of a technique for one thread to stop execution of one or more other threads of a multi-threaded processor. The technique is implemented to avoid hangs and to ensure all instructions associated with the other threads are completed before they are stopped. This technique includes, in one aspect, a pipeline DRAIN instruction that looks at status information from all hardware threads of the processor (or selected threads in another embodiment) to see if the conditions are satisfied before continuing operation at this thread.

Further, one embodiment of this technique uses atomic instructions, such as CSGRU, LORU and LNRU, to operate on shared registers. For instance, when two or more threads share a common core, in a multi-threaded core design (e.g., SMT), they often need to communicate and share information; this could include semaphores, locks, etc. This could involve firmware, millicode, or it could involve software. The threads could use existing ISA instructions that communicate through storage. However, these may be slow and involve store-hit-load or load-hit-store conflicts (commonly known as Operand Store Compare (OSC)). In addition, if the communication is done by firmware, it may be undesirable or impossible to communicate via storage; a firmware routine could be in the middle of a critical sequence where operand loads and stores are prohibited. Thus, these instructions operate on registers, instead of storage.

Although the atomic instructions are described in relation to controlling execution of threads, they may be used for other purposes. Each instruction stands apart from the use described herein and may be utilized in other situations.

Figure 12:
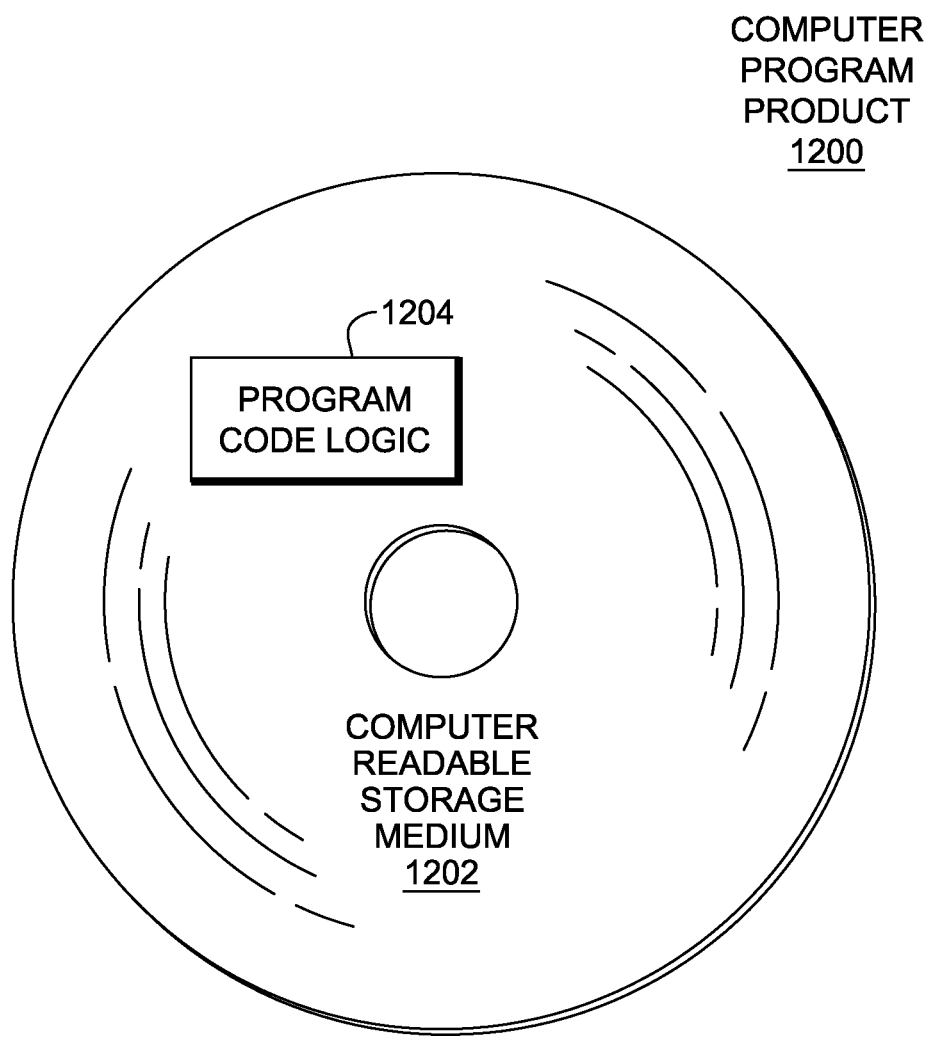
FIG. 12 depicts one embodiment of a computer program product.

Referring to FIG. 12, in one example, a computer program product 1200 includes, for instance, one or more non-transitory computer readable storage media 1202 to store computer readable program code means, logic and/or instructions 1204 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments. Further, one or more aspects of the invention are applicable to forms of multi-threading, other than SMT. Yet further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system for facilitating control in a multi-threaded processor, said computer system comprising:

a memory; and the multi-threaded processor in communications with the memory, wherein the computer system is configured for:

obtaining, by the multi-threaded processor, a first instruction to be executed to perform a first operation and a second instruction to be executed to perform a second operation, the first instruction being initiated by a first thread of the multi-threaded processor and the second instruction being initiated by a second thread of the multi-threaded processor;

initiating execution, by the multi-threaded processor, of the first instruction to perform the first operation and the second instruction to perform the second operation, the first operation and the second operation each comprising multiple sub-operations to be performed atomically, wherein the first instruction enters a first pipeline and the second instruction enters a second pipeline;

determining, by the multi-threaded processor, whether the first instruction and the second instruction are to continue to execute, the determining using interlocking to determine whether the first instruction or the second instruction has atomic access to one or more registers shared by the first thread, the second thread, and one or more other threads of the multi-threaded processor, wherein the one or more registers are accessed by multiple threads during execution of instructions and comprise one or more hardware registers separate from memory of the multi-threaded processor, and wherein the interlocking is to control inter-thread and intra-thread operations by guaranteeing atomicity with accesses to the one or more registers shared by the first thread, the second thread, and the one or more other threads, wherein the first thread, the second thread, and the one or more other threads can each individually freely write the one or more registers, wherein the determining is based on utilizing a register to generate a random number to select, based on a most significant bit of the random number either the first pipeline or the second pipeline to set an interlock, wherein the interlock comprises a value placed in a hardware register accessible to the multiple threads, in order to provide the atomic access to the one or more registers to the first instruction or the second instruction;

continuing execution, by the multi-threaded processor, of the first instruction based on the interlocking indicating the first instruction is to execute, the continuing execution comprising performing the first operation including using at least one shared register of the one or more registers shared by the first thread, the second thread, and the one or more other threads of the multi-threaded processor to perform the first operation;

rejecting execution, by the multi-threaded processor, of the second instruction based on the interlocking indicating a prior instruction has atomic access to the one or more registers; and re-executing, by the multi-threaded processor, the second instruction, at completion of execution of the first instruction.

2. The computer system of claim 1, wherein the rejecting comprises determining that an interlock of the second instruction is set.

3. The computer system of claim 1, wherein the first instruction comprises a compare and swap register instruction.

4. The computer system of claim 1, wherein the first instruction comprises a load and AND register instruction.

5. The computer system of claim 1, wherein the first instruction comprises a load and OR register instruction.

6. A computer program product for facilitating control in a multi-threaded processor, said computer program product comprising:

a computer readable storage medium readable by the multi-threaded processor and storing instructions for execution by the multi-threaded processor for performing a method comprising:

obtaining, by the multi-threaded processor, a first instruction to be executed to perform a first operation and a second instruction to be executed to perform a second operation, the first instruction being initiated by a first thread of the multi-threaded processor and the second instruction being initiated by a second thread of the multi-threaded processor;

initiating execution, by the multi-threaded processor, of the first instruction to perform the first operation and the second instruction to perform the second operation, the first operation and the second operation each comprising multiple sub-operations to be performed atomically, wherein the first instruction enters a first pipeline and the second instruction enters a second pipeline;

determining, by the multi-threaded processor, whether the first instruction and the second instruction are to continue to execute, the determining using interlocking to determine whether the first instruction or the second instruction has atomic access to one or more registers shared by the first thread, the second thread, and one or more other threads of the multi-threaded processor, wherein the one or more registers are accessed by multiple threads during execution of instructions and comprise one or more hardware registers separate from memory of the multi-threaded processor, and wherein the interlocking is to control inter-thread and intra-thread operations by guaranteeing atomicity with accesses to the one or more registers shared by the first thread, the second thread, and the one or more other threads, wherein the first thread, the second thread, and the one or more other threads can each individually freely write the one or more registers, wherein the determining is based on utilizing a register to generate a random number to select, based on a most significant bit of the random number either the first pipeline or the second pipeline to set an interlock, wherein the interlock comprises a value placed in a hardware register accessible to the multiple threads, in order to provide the atomic access to the one or more registers to the first instruction or the second instruction;

continuing execution, by the multi-threaded processor, of the first instruction based on the interlocking indicating the first instruction is to execute, the continuing execution comprising performing the first operation including using at least one shared register of the one or more registers shared by the first thread, the second thread, and the one or more other threads of the multi-threaded processor to perform the first operation;

rejecting execution, by the multi-threaded processor, of the second instruction based on the interlocking indicating a prior instruction has atomic access to the one or more registers; and re-executing, by the multi-threaded processor, the second instruction, at completion of execution of the first instruction.

7. The computer program product of claim 6, wherein the rejecting comprises determining that an interlock of the second instruction is set.

8. The computer program product of claim 6, wherein the first instruction comprises one of a compare and swap register instruction, a load and AND register instruction, or a load and OR register instruction.

* * * * *